Patented Dec. 27, 1938

2,141,965

UNITED STATES PATENT OFFICE 2,141,965

MARKING MATERIAL

Lester Aronberg, Chicago, Ill.

No Drawing. Application November 1, 1938,
Serial No. 238,264

20 Claims. (Cl. 106—5)

This application is, in part, a continuation of my copending application, Serial Number 71,682, filed March 30, 1936.

My invention relates to materials for marking surfaces and has a special application to the marking of surfaces of articles which are either hot at the time of marking or are subsequently heated.

There has long been a problem in connection with the painting or marking of hot metals, such as ingots, billets and other metallurgical products which must be marked for identification as they come from the furnace or mold, as well as articles which are subsequently heated, such as cold metals which are to be annealed, smoke stacks, exhaust tubes of engines, etc. Marking materials which have been produced in solid form have, in general, proved unsatisfactory for the reason that a pencil capable of producing a broad, legible mark would either soften or melt in the hand, due to radiant heat, or would char and peel from the surface, or be unable to withstand the effects of temperature changes and other weather conditions. Crayons of the type heretofore used for marking hot surfaces and consisting of high melting point waxes have proved unsatisfactory for higher temperatures than, say, about 300 or 400° F., because such materials adhere poorly, char easily, and are quickly obliterated, and, furthermore, such materials, when applied to a hot surface, have a tendency to flow and are thus incapable of producing a clear mark. Paints of the usual type have been found totally inadequate for the marking of hot objects, or objects subjected to high temperatures, because of their inability to withstand such temperatures without decomposition. As is well known, the temperature of ferrous castings at the time marking is required, according to usual plant practice, ranges up to 1600° F.

I have discovered a composition for marking surfaces which is capable of withstanding temperatures up to 1600° F. and higher and which will avoid all of the disadvantages mentioned above. Products embodying my invention may be used in the form of a stick or pencil. In stick form, products embodying my invention are especially adaptable to the marking of hot surfaces.

Compositions embodying my invention, when applied to a hot surface or to a cold surface subsequently heated, are capable of producing a full, clear mark which does not flow even at the temperatures mentioned above, and firmly adheres to the surface. The mark will remain clear and legible on the surface under all conditions of weather, vibration, etc., protects the surface to which it is applied against oxidation, and is not removable from the surface by reason of the rusting or oxidation of the adjacent portions of the metal surface.

While my invention is especially applicable to the marking of metals which are subjected to high temperatures, it is also applicable to the marking of various other materials besides metals and may also be used for marking cold surfaces which are not to be heated. My invention contemplates a composition of matter for the purposes mentioned, said composition including (a) a coloring material and a carrier, or (b) a coloring material, a bonding material, and a carrier, or (c) a bonding material and a carrier. These terms will be fully defined as the description proceeds.

According to one phase of my invention, wherein the material is to be produced in solid form especially suitable for the marking of materials at a high temperature, said invention contemplates a composition comprising a resin carrier together with a coloring material. The preferred resin is one formed by the reaction of a polybasic acid with a polyhydric alcohol. The coloring material in the preferred embodiment is titanox alone (for a white color) or mixed with colored inorganic pigments, or the coloring may be other types of coloring agents, such as dyes, lakes, etc., which are capable of withstanding the required temperatures. In some cases it is desired to use an excess of pigment (which term is used herein generically to indicate coloring material) beyond the portion required to give the desired color, as based upon the quantity of resin, because such excess aids in stiffening the material against heat, preventing softening in the hand and flowing of the film on material which may remain at a high temperature for a period of several hours.

The polyhydric alcohol-polybasic acid resins are known in themselves and are either thermoplastic or theremo-hardening in character. The thermo-hardening resins are used in my invention while in an unfinished state, in which state, as will be understood by those skilled in the art, the material is still in meltable and not in a permanently hardened condition. The term "meltable resin" as used herein is thus intended to include thermoplastic resin, preferably of the polyhydric alcohol-polybasic alcohol type, the latter being either thermoplastic in character or else unfinished thermo-hardening resins, the latter being unfinished and thus also thermoplastic in character.

My invention also contemplates an improved method of producing a marking material of the class referred to. According to one manner of practicing said invention, when the marking material is to be in solid form, I incorporate with the fused resin a material for thinning the same, in order to permit the incorporation of a large excess of pigment, said thinning material also aiding to prevent softening of the finished material at lower temperatures. Said material should have the properties of being readily compatible with the resin at fusing temperatures and of not charring at high temperatures. I have preferably used for this purpose phthalic anhydride or benzoic acid.

I have also discovered that the incorporation with the pigment or coloring material of a substance which I refer to herein as a bonding or fixing agent functions to cause firm adherence of pigment to the surface to which it is applied at high temperatures, after the vehicle or carrier has volatilized off or has been destroyed by heat. I have found that the substances which serve best as bonding agents in accordance with my invention are those which are fusible and in the process of fusing have the property of adhering firmly to hot metal surfaces. The bonding agents must also have a fusing point lower than the softening point of the metal to which they are applied, and, of course, have no undesired effect upon the color. At the present time, I am not able to state with any certainty the nature of the reaction of the bonding agent or the manner in which it performs its function. One theory is that said material reacts chemically at high temperatures upon both the coloring matter and the surface to which the material is applied, to form a chemical union and a firm, physical bond therebetween. Another theory is that the effect of the bonding agent is mainly physical, serving somewhat as a flux, affecting the surface tension of the pigment in such a way that the latter and the surface are effectively "wetted" so that the coloring matter is permitted to enter into the most minute pores of the surface and thus forms an extremely close and firmly adherent coating thereon even after the vehicle has evaporated or burned off.

I am aware that varnish formulas have been suggested which contain minor quantities of phosphoric acid and rust proofing compounds have also been disclosed containing phosphoric acid salts. However, so far as I know, no one has heretofore sugested a solid marking material for marking or coating a hot surface or a cold surface which is to be heated, such material containing a substantial quantity of an acidic substance serving as a wetting agent at high temperatures for assuring firm adherence to a surface of a pigment or coloring material.

I have found that, depending on the duty to be performed by the marking implement, I can use as a vehicle or carrier for solid marking implements, singly or in combination, such substances as natural and synthetic resins, high melting point waxes of natural or synthetic origin, organic acids such as phthalic acid or phthalic anhydride, and esters of organic and inorganic acids such as the esters of phthalic and phosphoric acids and of equivalent substances, or other materials which will hold the bonding agent and pigment together.

For pigments, I can use any type of the inorganic substances commonly used for pigmentation purposes, as well as dyes, lakes and similar organic materials, depending upon the range of temperatures to which the implement is intended to be subjected.

For the bonding or fixing agent, the following substances and combinations thereof have been found suitable: sodium acid phosphates, sodium bisulphate, potassium bisulphate, phosphoric acid (100%), sulphuric acid (sp. g. 1.84), calcium acid phosphate (mono basic). In general, I have found that substances having an acid reaction with litmus can be used advantageously as efficient bonding agents. The preferred bonding agent is monosodium phosphate.

The following examples are given merely as illustrative of my invention and not in any sense as limiting.

Example I

Melt 10 parts by weight of a resin formed by the reaction of a polybasic acid with a polyhydric alcohol, preferably ethylene glycol phthalate or glycerine phthalate when it is still unfinished and then add 8 to 15 parts of a white pigment such as titanox and/or a coloring material such as carbon black, cadmium, cobalt, iron, or chromium pigment, etc., or a mixture of white and colored pigments to obtain any desired shade. The resin is melted to a relatively thin consistency in any suitable container, such as an open vessel, and the pigment or coloring matter of the material is then stirred in until it is thoroughly and uniformly mixed. The mixture is then poured while hot into molds or forms of any suitable size and shape. I preferably mold the material into cylindrical forms of about 4" to 8" in length and from ½" to 1" in diameter, but it will be obvious that the shape and size may be varied according to the use to which the article is to be put and the fancy of the user. After the material has cooled and solidified, it is ready to be taken from the molds and packed for shipment.

Various other resins may be substituted for those named in the above example, but in choosing the resin care must be taken not to select one which will produce an unmeltable product. A normaly soft resin may be used, such as diethylene glycol phthalate, and, by prolonging the heating, the same may be modified so that, on cooling, the product will have the desired properties. Other resins which may be used according to my invention include ethylene glycol succinate, as well as a resin made from glycerine and a mixture of polybasic acids, such as citric, malic, fumaric, tartaric, etc., or a mixture of resins of this type.

Example II

It is found that for certain purposes the following formula has special advantages, the parts being given by weight:

|  | Parts |
|---|---|
| Meltable resin | 7.5–12.5 |
| Phthalic anhydride | 12.5– 7.5 |
| Pigment | 30 –40 |

The preferred quantities are 10:10:30 parts of the ingredients, in the order given above.

The phthalic anhydride or equivalent is preferably added after the resin is fused, in order to thin out the melt, and the pigment is then incorporated by stirring. As stated above, I am thus enabled to use a substantial excess of pigment, which functions to increase the stiffness of the material and aids its resistance to bending in the presence of radiant heat.

Material embodying Example II is especially useful in the marking of very hot surfaces in that a body of a stick or marker containing this formula will resist radiant heat for a long period of time without any tendency to bend or flow in the operator's hand.

Example III

| | Parts |
|---|---|
| Meltable resin such as ethylene glycol phthalate (by weight) | 10 |
| Phthalic anhydride | 10 |
| Titanox | 20 |
| Monosodium phosphate (anhydrous), for which may be substituted 10 parts sodium bisulphate fused and finely ground | 10 |

The resin is melted with the phthalic anhydride and the pigment stirred in until uniformly dispersed and then the monosodium phosphate is added and the mix is stirred until it is uniform in consistency. If desired, the monosodium phosphate can be added before the pigment. The mix is then molded into desired shapes and dimensions.

This stick does not mark on cold surfaces but it marks on hot surfaces of a temperature of 200° F. or above. The vehicle may volatilize or decompose or burn off, but the resulting film of the pigment marks will remain firmly fixed to the surface of the metal under all kinds of weather conditions.

In the above example the resin may be entirely left out and substituted with an equal weight of phthalic anhydride. For the resin specified may also be substituted other meltable synthetic resins or natural gums such as ester gum, pine rosin and the like, or waxes such as carnauba wax and its equivalents. These substitutes may be used alone or in combination with phthalic anhydride. The phthalic anhydride may be left out in the above example and substituted with an equal weight of resin or with other equivalent substances which are capable of functioning as an efficient vehicle for the pigment or coloring material in my composition and suitable to form a strong and firm stick by molding. Depending on the pigment used, the quantities of each of the materials selected for the vehicle to be used either singly or in combination with one another should be such as to be just sufficient to thoroughly disperse the pigment or pigments and to form a solid continuous film when applied to a hot surface.

The titanox specified by me in the examples can be substituted in whole or in part with other pigments or coloring materials of inorganic or organic origin, depending on shade or color desired and on the temperature to which the material is subjected. For example, carbon black or a barium lake of an organic dye may be used.

For the monosodium phosphate specified by me in the above example can be substituted any of the acidic materials listed above or other acidic materials which will perform the desired function under the required conditions.

Example IV

| | Parts |
|---|---|
| Drying oil such as linseed oil by weight | 5 |
| Pine rosin | 20 |
| Paraffine wax | 8 |
| Carnauba wax | 8 |
| Stearine | 40 |
| Titanox | 70 |
| Monosodium phosphate (anhydrous) | 40 |

Example IVa

| | Parts |
|---|---|
| Paraffine wax | 10 |
| Carnauba wax | 1 |
| Titanox | 6 |
| Monosodium phosphate for torch cutting marker | 4 |

The waxes and rosin are melted together with the drying oil to a uniform melt and then the titanox and the monosodium phosphate are added and stirred until the melt is uniform in consistency. The mix is then molded into sticks or other desired shapes of suitable dimensions. The above composition results in a solid marking implement which will mark on cold surfaces. If the marked material is subsequently subjected to a temperature of 1400°-1600° F. in an annealing furnace or otherwise, the organic matter either volatilizes or burns off, but the film of the pigment remains firmly fixed on the surface and withstands all kinds of weather conditions.

I have also found that a satisfactory mark may be produced on metals which are to be heated, or on hot metals, especially when subjected to very high temperatures, by means of a bonding agent of the character described herein merely in conjunction with a carrier such as a natural or synthetic wax and/or resin. My preferred bonding agent is monosodium phosphate; the specific carriers mentioned above are applicable in this connection, and any other solid bonding agent besides monosodium phosphate may likewise be used. I may use a wide variety of proportions depending upon the result desired and as an example I may use 10 parts of monosodium phosphate to 10 parts of carnauba wax. While the resulting mark obtained is not quite as full as where a pigment is used, I have found, nevertheless, that a legible mark may be obtained without the use of a pigment.

Compositions embodying my invention have many advantages, as stated above. All of them adhere with great tenacity to a surface and have especially great adhering properties where a bonding or fixing agent has been employed in accordance with certain phases of my invention, particularly where the film has been subjected to an elevated temperature. At temperatures where the vehicle is entirely destroyed, as by volatilizing or burning off, a firmly adherent film results from the use of a bonding agent as described above. Moreover, in the solid embodiments of my invention, my products have the advantage of fusing over a great range of temperatures, say from about 200° to 1600° F. and thus are adaptable for marking the surfaces of articles at various periods after they have come from a furnace. This feature is of great value for the reason that marking need not be accomplished at any set time relative to the cooling of an article or relative to its time of withdrawal from a furnace or mold.

Various changes coming within the spirit of my invention may suggest themselves to those skilled in the art, and hence I do not wish to be limited to the specific embodiments disclosed above or uses mentioned, except to the extent indicated by the appended claims, which are to be interpreted as broadly as the state of the art will permit.

As stated above, the word "pigment" is used in a broad sense to indicate any suitable coloring material, and not in a technical sense.

I claim:

1. A solid marking implement for hot surfaces, comprising a pigment, a carrier therefor, and an acidic bonding or fixing agent capable at high temperatures of wetting the pigment and the surface to which it may be applied so as to facilitate the spreading of a film and firm adherence of the latter to said surface.

2. A marking implement in solid form especially suitable for marking on a hot surface, comprising a pigment, a carrier therefor, and a bonding or fixing agent capable at high temperatures of wetting the pigment and the surface to which it may be applied so as to facilitate the spreading of a film and firm adherence of the latter to said surface, said bonding or fixing agent being a member of the group consisting of alkali and alkaline earth acid phosphates, alkali bisulphate, phosphoric acid, and sulphuric acid.

3. A solid marking implement for hot surfaces, comprising a pigment, a carrier therefor capable of being eliminated by elevated temperatures, and a bonding or fixing agent capable at high temperatures of wetting the pigment and the surface to which it may be applied so as to facilitate the spreading of a coat and firm adherence of the latter to said surface, and the bonding agent being a substance acid to litmus and capable of resisting complete volatilization at the temperature to which the composition is subjected.

4. A marking implement in solid form especially suitable for marking on a hot surface, comprising a meltable resin formed from the reaction of a polybasic organic acid with a polyhydric alcohol, and having an inorganic pigment incorporated therein.

5. A marking implement in solid form especially suitable for marking on a hot surface, comprising a meltable resin formed from the reaction of a polybasic organic acid with a polyhydric alcohol, and having an inorganic pigment incorporated therein, said pigment being present in excess over the quantity necessary to provide the desired color.

6. A marking implement in solid form especially suitable for marking on a hot surface, comprising a meltable resin formed from the reaction of a polybasic organic acid with a polyhydric alcohol, phthalic anhydride, and an inorganic pigment.

7. A marking implement in solid form especially suitable for marking on a hot surface, comprising a meltable resin formed from the reaction of a polybasic organic acid with a polyhydric alcohol, phthalic anhydride, and an inorganic pigment, said pigment being present in excess over the quantity necessary to provide the desired color.

8. A marking implement in solid form especially suitable for marking on a hot surface, comprising at least one member of the group consisting of ethylene glycol phthalate and unfinished glycerine phthalate, and an inorganic pigment.

9. A marking implement in solid form especially suitable for marking on a hot surface, comprising at least one member of the group consisting of ethylene glycol phthalate and unfinished glycerine phthalate, and an inorganic pigment, said pigment being present in excess over the quantity necessary to provide the desired color.

10. A marking implement in solid form especially suitable for marking on a hot surface, comprising at least one member of the group consisting of ethylene glycol phthalate and unfinished glycerine phthalate, phthalic anhydride, and an inorganic pigment.

11. A marking implement in solid form especially suitable for marking on a hot surface, comprising at least one member of the group consisting of ethylene glycol phthalate and unfinished glycerine phthalate, phthalic anhydride, and an inorganic pigment, said pigment being present in excess over the quantity necessary to provide the desired color.

12. A method of producing an article of the class described, comprising melting a resin formed from the reaction of a polybasic organic acid with a polyhydric alcohol, uniformly dispersing therein an inorganic pigment, and molding said material into a form suitable for marking purposes, to produce an article having a fusing range of about 200°–1200° F.

13. A method of producing an article of the class described, comprising melting a resin formed from the reaction of a polybasic organic acid with a polyhydric alcohol, adding to the melt an organic substance compatible with said resin which will reduce the viscosity of the melt and which is substantially uncharable, incorporating in the melt an excess of inorganic pigment beyond the quantity required for coloring, and molding the material, the resin being so selected and the heating being so conducted as to produce an article having a fusing range of about 200°–1200° F.

14. A method of producing a marking implement comprising melting a resin formed from the reaction of a polybasic organic acid with a polyhydric alcohol, adding to the melt a member of the group consisting of benzoic acid and phthalic anhydride for the purpose of thinning the same, incorporating in the melt an excess of inorganic pigment beyond the quantity required for coloring, and molding the material, the resin being so selected and the heating being so conducted as to produce an article having a fusing range of about 200–1200° F.

15. A marking implement in solid form especially suitable for marking on a hot surface, comprising a meltable resin formed from the reaction of a polybasic organic acid with a polyhydric alcohol, a member of the group consisting of phthalic anhydride and benzoic acid, and an inorganic pigment, said pigment being present in excess over the quantity necessary to provide the desired color.

16. A marking implement in solid form especially suitable for marking on a hot surface, comprising a meltable resin formed from the reaction of a polybasic organic acid with a polyhydric alcohol, and having a pigment incorporated therein.

17. A marking implement in solid form especially suitable for marking on a hot surface, comprising a meltable resin formed from the reaction of a polybasic organic acid with a polyhydric alcohol, phthalic anhydride, and having a pigment incorporated therein.

18. A solid marking implement for hot surfaces, comprising a pigment, a vehicle which is capable of being eliminated at high temperatures, and an acidic wetting agent capable of bonding the pigment firmly to a metal surface at elevated temperatures.

19. A solid marking implement for hot surfaces, comprising a pigment, a vehicle which is solid at room temperatures and capable of resisting radiant heat without bending or flowing, and an acidic wetting agent capable of bonding the pigment firmly to a metal surface at elevated temperatures.

20. A solid marking implement for hot surfaces capable of producing a firmly adherent film on said surface when, after application to the surface, said composition is subjected to an elevated temperature, said composition comprising a solid acidic substance and a carrier therefor.

LESTER ARONBERG.